United States Patent
Sapija et al.

(10) Patent No.: US 12,422,082 B2
(45) Date of Patent: Sep. 23, 2025

(54) WYE FITTING ATTACHMENT

(71) Applicant: Goodrich Corporation, Charlotte, NC (US)

(72) Inventors: Dariusz Sapija, Kiełczówek (PL); Piotr Kroczek, Nieciszów (PL); Agata Kurowska-Kalińska, Kowale (PL)

(73) Assignee: GOODRICH CORPORATION, Charlotte, NC (US)

( * ) Notice: Subject to any disclaimer, the term of this patent is extended or adjusted under 35 U.S.C. 154(b) by 43 days.

(21) Appl. No.: 18/075,562

(22) Filed: Dec. 6, 2022

(65) Prior Publication Data

US 2023/0175626 A1 Jun. 8, 2023

(30) Foreign Application Priority Data

Dec. 6, 2021 (EP) .................................. 21461630

(51) Int. Cl.
*F16L 41/02* (2006.01)
*E03C 1/122* (2006.01)

(52) U.S. Cl.
CPC ............ *F16L 41/023* (2013.01); *E03C 1/122* (2013.01)

(58) Field of Classification Search
CPC ............................... F16L 21/06; F16L 41/023
See application file for complete search history.

(56) References Cited

U.S. PATENT DOCUMENTS

| | | | |
|---|---|---|---|
| 5,269,572 A * | 12/1993 | Mefferd | F16L 21/06 |
| 6,260,819 B1 * | 7/2001 | Ovsepyan | F16K 35/06 |
| 6,834,892 B2 | 12/2004 | Kornau et al. | |
| 7,891,377 B2 | 2/2011 | Morris | |
| 8,783,293 B2 | 7/2014 | Morris | |
| 2008/0265567 A1 | 10/2008 | Morris | |
| 2012/0181786 A1 * | 7/2012 | Morris | F16L 41/023 |
| 2016/0245443 A1 * | 8/2016 | Zonneveld | F16L 37/18 |
| 2022/0196171 A1 * | 6/2022 | Kroczek | F16K 31/36 |

FOREIGN PATENT DOCUMENTS

EP 3399113 A1 11/2018

OTHER PUBLICATIONS

European Search Report for Application No. 21461630.2, mailed May 12, 2022, 9 pages.

* cited by examiner

*Primary Examiner* — Zachary T Dragicevich
(74) *Attorney, Agent, or Firm* — CANTOR COLBURN LLP

(57) ABSTRACT

An assembly for connecting a wye fitting to another fluid conduit part of a fluid system includes the wye fitting, the other fluid conduit part and a clamshell fastener. The wye fitting defines a main fluid flow path along an axis A between a first end and a second end. An end of the wye fitting to be connected to the another fluid conduit part is provided with a plurality of first engagement features arranged circumferentially around the end of the wye fitting and an end of the another fluid conduit part is provided with a corresponding plurality of second engagement features arranged circumferentially around the end of the another fluid conduit part configured to engage with the first engagement features. The clamshell is secured around the end of the wye fitting and the another fluid conduit part over the interface between the first and second engagement features.

11 Claims, 1 Drawing Sheet

WYE FITTING ATTACHMENT

CROSS-REFERENCE TO RELATED APPLICATIONS

This application claims priority to European Patent Application No. 21461630.2 filed Dec. 6, 2021, the entire contents of which is incorporated herein by reference.

TECHNICAL FIELD

The present disclosure is concerned with assembling wye fittings to other pipes or parts of a plumbing or water system allowing the wye fitting to be attached using clamshells.

BACKGROUND

So-called wye fittings are used in many plumbing applications to create a branch from a main fluid flow line. The wye fitting is connected between other pipes or ports of fittings on the system and requires a fluid-tight seal. Typically, wye fittings are provided with threaded ends that connect to other system parts having a complementary thread. This requires relative rotation between the parts to fasten the thread. Usually, additional sealing e.g. sealing tape or the like is required around the threaded connection.

Often, the position and orientation of the wye fitting is fixed. For example, wye fittings can be used in grey water systems. Grey water systems are systems where water which has been used for one thing can then be re-used for something else. For example, potable water that has drained away can then be re-used for flushing a lavatory. Grey water systems are often used in building complexes or in aircraft. A valve e.g. a motorised valve is provided to direct and control the flow of grey water to the flush. Typically, a sensor is provided in the branch arm of the wye valve. One end of the main flow channel of the wye fitting is connected to the supply of water e.g. the outlet or waste pipe of a wash basin and the other end is connected to the valve. While the valve is closed, the grey water collects in the main flow channel of the wye fitting. When the main channel is full, the branch arm begins to fill. As the water fills past the level of the sensor, the sensor triggers opening if the valve, allowing the build up of grey water to flow through the valve to e.g. the flush. To meet the requirement of being able to drain water under gravity, the wye fitting has to have a fixed position and orientation.

Where the position and orientation of the wye valve is fixed and where space is restricted, attaching wye fittings to the ports of a valve or to other ports or fittings by means of a threaded attachment is not always easy and is sometimes not possible.

Clamshell fasteners are well-known for use in plumbing systems for securing flexible tubes or pipes to other system parts such as to ports of the system/valve. Often, clamshells are prescribed for specific attachments. Clamshells, such as so-called Hydraflow or Wiggins clamshells are simple, inexpensive and readily available parts but have only found use in securing flexible pipes/tubes and have not, however, found use in attaching wye fittings.

The attachment of the present disclosure allows for the use of clamshells for attaching wye fittings to other system parts e.g. to the ports of a valve.

SUMMARY

Accordingly, the present disclosure provides an assembly for connecting a wye fitting to another fluid conduit part of a fluid system, the assembly including the wye fitting, the other fluid conduit part and a clamshell fastener, the wye fitting defining a main fluid flow path along an axis A between a first end and a second end, wherein an end of the wye fitting to be connected to the another fluid conduit part is provided with a plurality of first engagement features arranged circumferentially around the end of the wye fitting and an end of the another fluid conduit part is provided with a corresponding plurality of second engagement features arranged circumferentially around the end of the another fluid conduit part configured to engage with the first engagement features, and wherein the clamshell is secured around the end of the wye fitting and the another fluid conduit part over the interface between the first and second engagement features, wherein the first engagement features comprise protrusions extending axially from the end of the wye fitting and the second engagement features comprise corresponding recesses formed around the end of the another fluid conduit arranged to receive the protrusions, or the second engagement features comprise protrusions extending axially from the end of the another fluid conduit the first engagement features comprise corresponding recesses formed around the end of the wye fitting arranged to receive the protrusions.

Also provided is a method of connecting a wye fitting to another fluid conduit part using the assembly defined above, the method comprising bringing, in the axial direction, the wye fitting and the other fluid conduit part into end-to-end engagement such that the first and second engagement features engage to prevent relative rotational movement between the wye fitting and the other fluid conduit part, then securing the clamshell fitting around the interface.

BRIEF DESCRIPTION

Examples of the attachment structure and method according to the disclosure will now be described by way of example only. It should be understood that variations are possible within the scope of the invention as defined by the claims.

DETAILED DESCRIPTION

The attachment concept of the present disclosure uses existing and commonly available clamshell fasteners, that are generally used for securing flexible hose to ports or other parts of a system, to attach a wye fitting to another system part such as a valve port whilst ensuring the required fixed position of the wye fitting.

Figure 1:
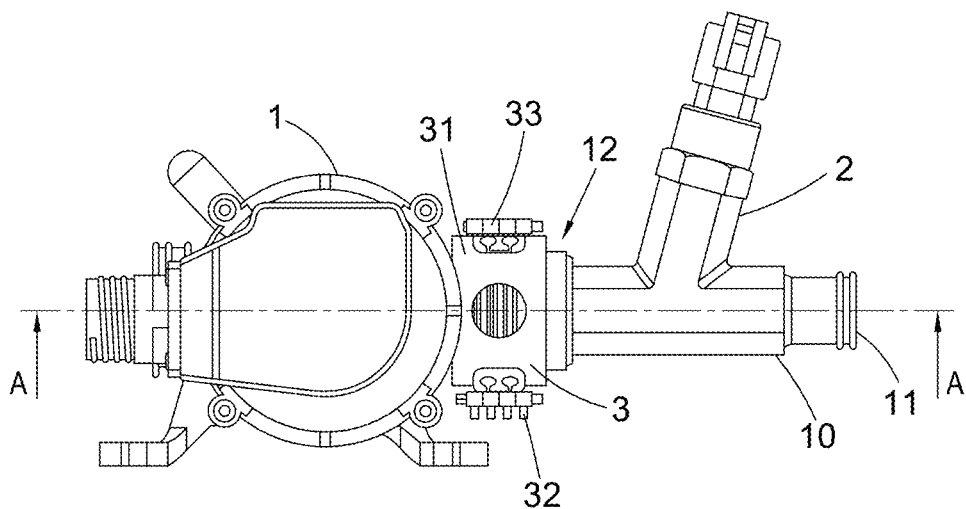
FIG. 1 shows a wye fitting attached to a motorised valve in accordance with the disclosure.
Figure 2A:
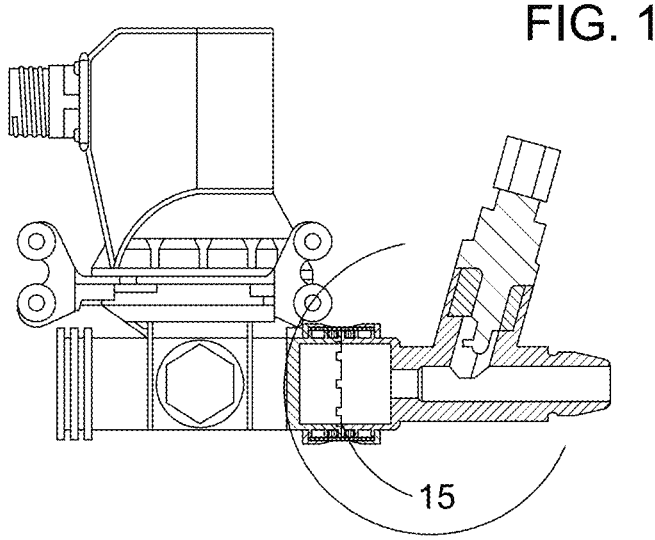
FIG. 2A is a sectional view of a wye fitting attached to a motorised valve in accordance with the disclosure.
Figure 2B:
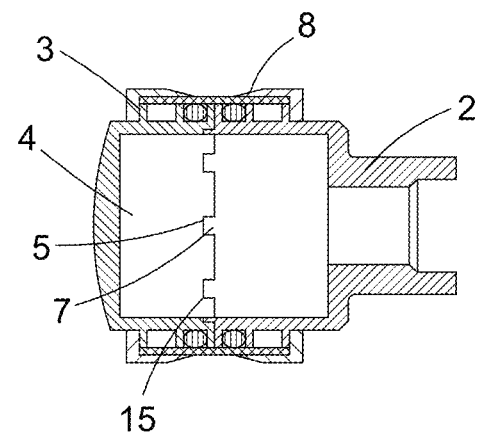
FIG. 2B is a detail of FIG. 2A.
Figure 3A:
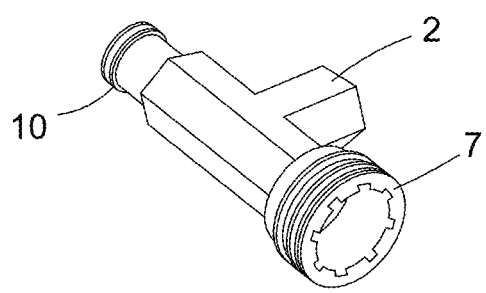
FIG. 3A shows a wye fitting adapted for attachment according to the disclosure.
Figure 3B:
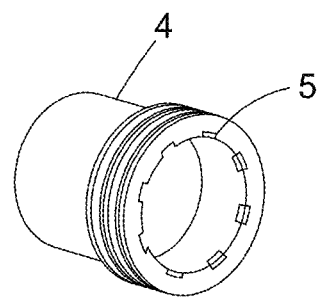
FIG. 3B shows a water port modified for attaching the fitting of FIG. 3A.

FIG. 1 shows a wye fitting 10 connected to a port 4 of a motorised valve 1. Attachment to a port of a motorised valve is just one example of how the teachings of the present disclosure can be used for attaching a wye fitting to another system part.

The flow path of the system shown in FIG. 1 is defined by line A that runs through the main flow path of the wye fitting 10, through the connecting port 4 and through the valve, when the valve 1 is open. The main flow path of the wye fitting is defined from a first end 11 to a second end 12. The first end 11 is arranged to be connected to a source of fluid (e.g. grey water) that is to be controlled by the opening and closing of the valve 1. The source may be, for example, a waste pipe of a wash basin. The second end 12 is arranged to be connected to the inlet port of the valve. A branch arm 2 of the wye fitting extends at an angle from the main flow path. The branch arm 2 may be for the purposes of re-directing fluid flow to another part of the system or may provide a location where water can be drained from the system e.g. if there is a blockage. In another example, the branch arm 2 may house a level sensor (not shown) such that when the valve is closed and fluid (e.g. water) accumulates in the main flow path of the wye fitting, the level of water in the branch arm 2 will rise. The sensor may detect a certain level of water and use this to trigger opening of the valve 1 to allow the water to flow through the valve.

The second end 12 of the wye fitting is attached to the port 4 of the valve 1 (or which ever other part of the system it is to be attached to) by means of a clamshell fastener 3 that wraps tightly around the adjoining end of the wye fitting and the water port 4. A clamshell 3 comprises two curved or arcuate arms 31 secured to each other by means of a hinge 32. To attach the clamshell around the connecting parts, the arms are opened about the hinge 32 and are then fitted and clamped closed around the connection. The ends of the arms remote from the hinge are then secured by a fastener such as a clip part 33.

A simple clamshell will, however, not prevent rotation of the wye fitting relative to the port or part to which it is connected. According to the present disclosure, therefore, the end of the wye fitting and the part to which it is connected are modified to secure the two parts against relative rotation. This modification will be described with reference to FIGS. 2A, 2B, 3A and 3B.

The end 12 of the wye fitting 10, which is to be connected to another part of the system (here a water port 4 of a valve 1) is provided with a number of protrusions 7 extending axially out from the end of the wye fitting. The part of the system to which the wye fitting is to be attached is provided with a corresponding number of receptacles 5 spaced and shaped and sized to receive the protrusions 7 when the wye fitting is attached to the other part 4. Thus, for assembly, the wye fitting and the other part are brought, in a generally axial direction (defined with respect to the axis along the main flow path of the wye fitting), into end to end engagement with each other, whereby the protrusions 7 will be received in corresponding receptacles 5 to fit the two parts together and prevent relative rotation of the wye fitting and the connected part. The connection region i.e. the interface where the wye fitting and the other part engage via the protrusions and receptacles is then further secured and sealed by means of a conventional clamshell 3 (any known type of clamshell may be suitable) fastened around the outer surface of the engaged wye fitting and other part overlapping the interface. The inner surface of the clamshell is provided with seals 8 that seal the area of the interface in a fluid tight manner to prevent leakage.

The location of the protrusions and receptacles can be reversed in that the protrusions could be provide on the part to which the wye fitting is to be connected and the receptacles can be formed on the end of the wye fitting.

Various shapes, sizes, numbers and locations of protrusions and matching receptacle are possible to achieve the desired result.

The modified connection structure can be provided at one or both ends of the wye fitting.

The invention enables the use of readily available, commonly used clamshells to attach wye fittings to other parts even when the rotation position of the wye fitting has to be fixed.

In conventional attachment designs, when a grey water system, for example, is built, the valve and the wye fitting have to be manufactured and provided as a single unit to maintain the fixed position of the fitting. With the present design, since the connection can be easily made using a clamshell, the wye fitting can be made as a separate part and can then be assembled, to different system parts, in service.

Further, the design allows a wye fitting to be easily and quickly separated from the parts to which it is connected for cleaning, maintenance, replacement etc.

The fact that the attachment of the wye fitting to parts of the system uses the same clamshell fastener as is used for connecting other parts of the system greatly simplifies the structure of the system and reduces the cost and complexity of building the system. Clamshells can be easily serviced and repaired or replaced if required.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An assembly for connecting a wye fitting to a valve of a fluid system, the assembly including:
   the wye fitting, wherein the wye fitting defines a main fluid flow path along an axis A between a first end and a second end;
   the valve, wherein the valve includes a port; and
   a clamshell fastener;
   wherein the second end is configured to be connected to the port and is provided with a plurality of first engagement features arranged circumferentially around the end of the wye fitting and the port is provided with a corresponding plurality of second engagement features arranged circumferentially around the port that engage with the first engagement features such that the second end does not rotate relative to the port when the port rotates,
   wherein the clamshell is secured around the second end of the wye fitting and the valve over an interface between the first and second engagement features,
   wherein the first engagement features comprise protrusions extending axially from the end of the wye fitting and the second engagement features comprise corresponding recesses formed around the end of the valve arranged to receive the protrusions, or the second engagement features comprise protrusions extending axially from the end of the valve and the first engagement features comprise corresponding recesses formed around the end of the wye fitting arranged to receive the protrusions.

2. The assembly of claim 1, wherein the clamshell fastener comprises a pair of relatively pivotal arcuate arms connected at a first end to each other via a hinge, the second ends of the arcuate arms pivotal towards and away from each other by movement of the arms about the hinge.

3. The assembly of claim 2, wherein fastening means is provided at the second end of one or both of the arcuate arms to releasably secure the arms together in a closed position.

4. The assembly of claim 3, wherein the fastening means is a clip.

5. The assembly of claim 1, wherein the wye fitting further comprises a branch arm extending away from the main fluid path, between the first and the second end.

6. The assembly of claim 5, further comprising a level sensor provided in the branch arm.

7. The assembly of claim 1, further comprising sealing means provided between the clamshell fastener and the interface.

8. The assembly of claim 1, wherein the valve is a motorised valve.

9. A water system comprising:
an assembly of claim 1;
wherein the valve is a motorised valve.

10. A water system as claimed in claim 9, being a grey water system, the valve being a grey water valve.

11. A method of connecting a wye fitting to a valve using the assembly of claim 1, the method comprising:
bringing, in the axial, A, direction, the wye fitting and the valve into end-to-end engagement such that the first and second engagement features engage to prevent relative rotational movement between the wye fitting and the valve, the method further comprising securing the clamshell fastener around the interface.

* * * * *